United States Patent [19]
Chen

[11] Patent Number: 5,388,333
[45] Date of Patent: Feb. 14, 1995

[54] SAW BLADE ADJUSTING MECHANISM

[76] Inventor: Chun-Chiung Chen, No. 11-5, Kuo-Chung Rd., Ta-Li City, Taichung Hsien, Taiwan, Prov. of China

[21] Appl. No.: 234,107

[22] Filed: Apr. 28, 1994

[51] Int. Cl.$^6$ .................................. B27B 21/02
[52] U.S. Cl. ................................ 30/508; 30/507; 30/513
[58] Field of Search ................ 30/507, 508, 509, 513

[56] References Cited

U.S. PATENT DOCUMENTS

| | | | |
|---|---|---|---|
| 1,548,393 | 8/1925 | Strug | 30/509 |
| 2,101,362 | 12/1937 | Davidson | 30/508 |
| 2,204,390 | 7/1940 | Albright | 30/508 |
| 2,213,841 | 9/1940 | Hubeck | 30/513 |
| 2,253,440 | 8/1941 | Martin | 30/508 |
| 2,399,869 | 5/1946 | Hough | 30/508 X |
| 2,715,426 | 8/1955 | Morris | 30/508 |
| 3,329,186 | 7/1967 | David | 30/508 |
| 5,217,158 | 12/1993 | Chen | 30/507 X |

FOREIGN PATENT DOCUMENTS 904665  8/1962  United Kingdom ................. 30/507

*Primary Examiner*—Eugenia Jones
*Attorney, Agent, or Firm*—Morton J. Rosenberg; David I. Klein

[57] ABSTRACT

A saw blade adjusting mechanism, which includes a first tightening up rod and a second tightening up rod fastened to the frame assembly of a hack saw at two opposite ends by nuts to hold the saw blade, a rotary adjusting knob mounted around the first tightening up rod and forced by a first spring to mesh with a toothed through hole on the front end of the frame assembly of the hack saw, a gear mounted around the second tightening up rod and forced by a second spring to disengage from the locating block, wherein the first and second tightening up rods are moved synchronously when the rotary adjusting knob is turned to change the angular position of the saw blade.

1 Claim, 5 Drawing Sheets

SAW BLADE ADJUSTING MECHANISM

BACKGROUND OF THE INVENTION

FIG. 1 shows a conventional hack saw having a handle and a frame fastened to the handle to hold a saw blade. The tension of the saw blade can be adjusted by a wing nut however, the angular position of the saw blade is not adjustable. U.S. Pat. No. 5,271,158, issued to the inventor of the present invention, discloses a saw blade adjusting device which permits the angular position of the saw blade to be adjusted conveniently. This saw blade adjusting device includes an adjusting link fastened to the handle to hold either end of the saw blade, a toothed locating block fastened to a front hook on the adjusting link and releasably meshed with the toothed locating block, and a spring mounted on the adjusting link and stopped between the gear and the handle. The gear can be moved backwards along the adjusting link to disengage from the toothed locating block, then rotated in either direction to turn the saw blade to the desired angle. This structure of saw blade adjusting device has drawbacks. Because the saw blade is adjusted from one end, it may be damaged easily when turned. Because the saw blade is fastened to the the handle and frame assembly by a tightening up screw rod and wing nut set, the wing nut must be loosened so that the gear can be disconnected from the toothed locating block and then rotated, the adjusting procedure is complicated. Furthermore, the limited space in the handle makes the adjustment difficult.

SUMMARY OF THE INVENTION

The present invention provides a saw blade adjusting mechanism which eliminates the aforesaid problems. According to the present invention, the saw blade adjusting mechanism comprises a first tightening up rod and a second tightening up rod fastened to the frame assembly of a hack saw at two opposite ends by nuts to hold the saw blade, a rotary adjusting knob mounted around the first tightening up rod and forced by a first spring to mesh with a toothed through hole on the front end of the frame assembly of the hack saw, a gear mounted around the second tightening up rod and forced by a second spring to disengage from the locating block. When the rotary adjusting knob is moved backwards from the first toothed through hole after the wing nut is loosened, the first and second tightening up rods can then be turned by the rotary adjusting knob to change the angular position of the saw blade. The first and second tightening up rods are moved synchronously when the rotary adjusting knob is turned to change the angular position of the saw blade.

DETAILED DESCRIPTION OF THE PREFERRED EMBODIMENT

Figure 1:
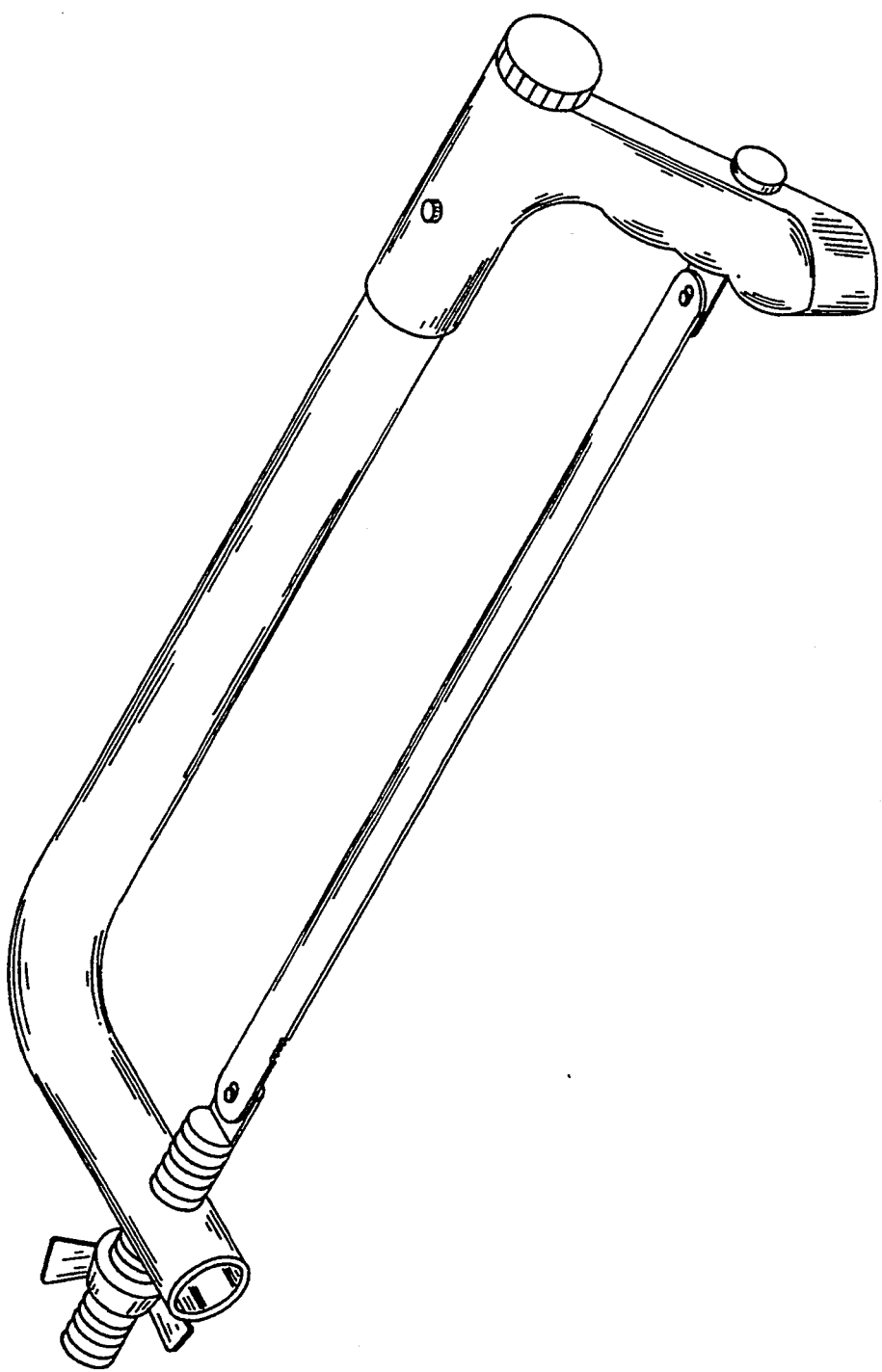
FIG. 1 is an elevational view of a hack saw according to the prior art.
Figure 2:
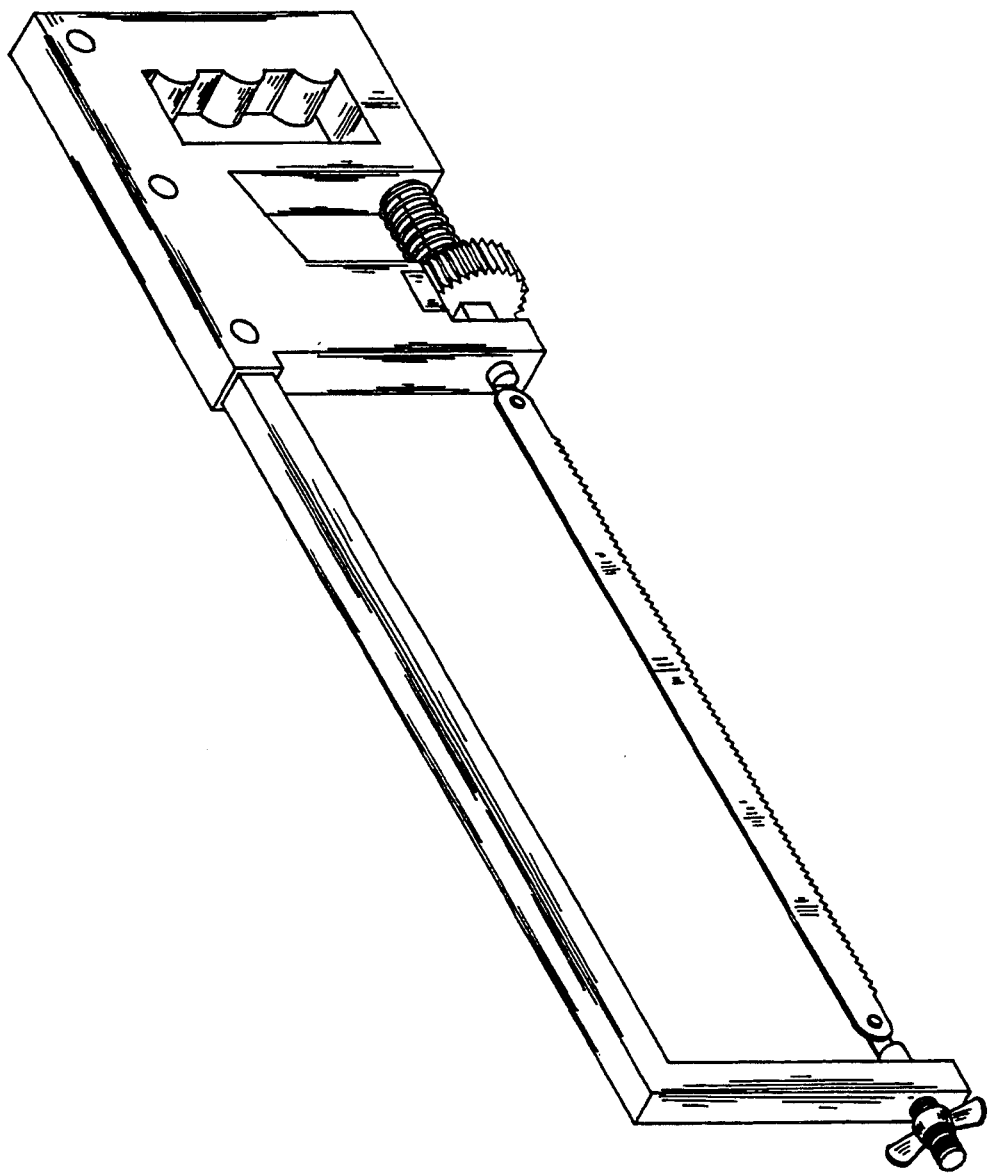
FIG. 2 is an elevational view of a hack saw according to U.S. Pat. No. 5,271,158.
Figure 3:
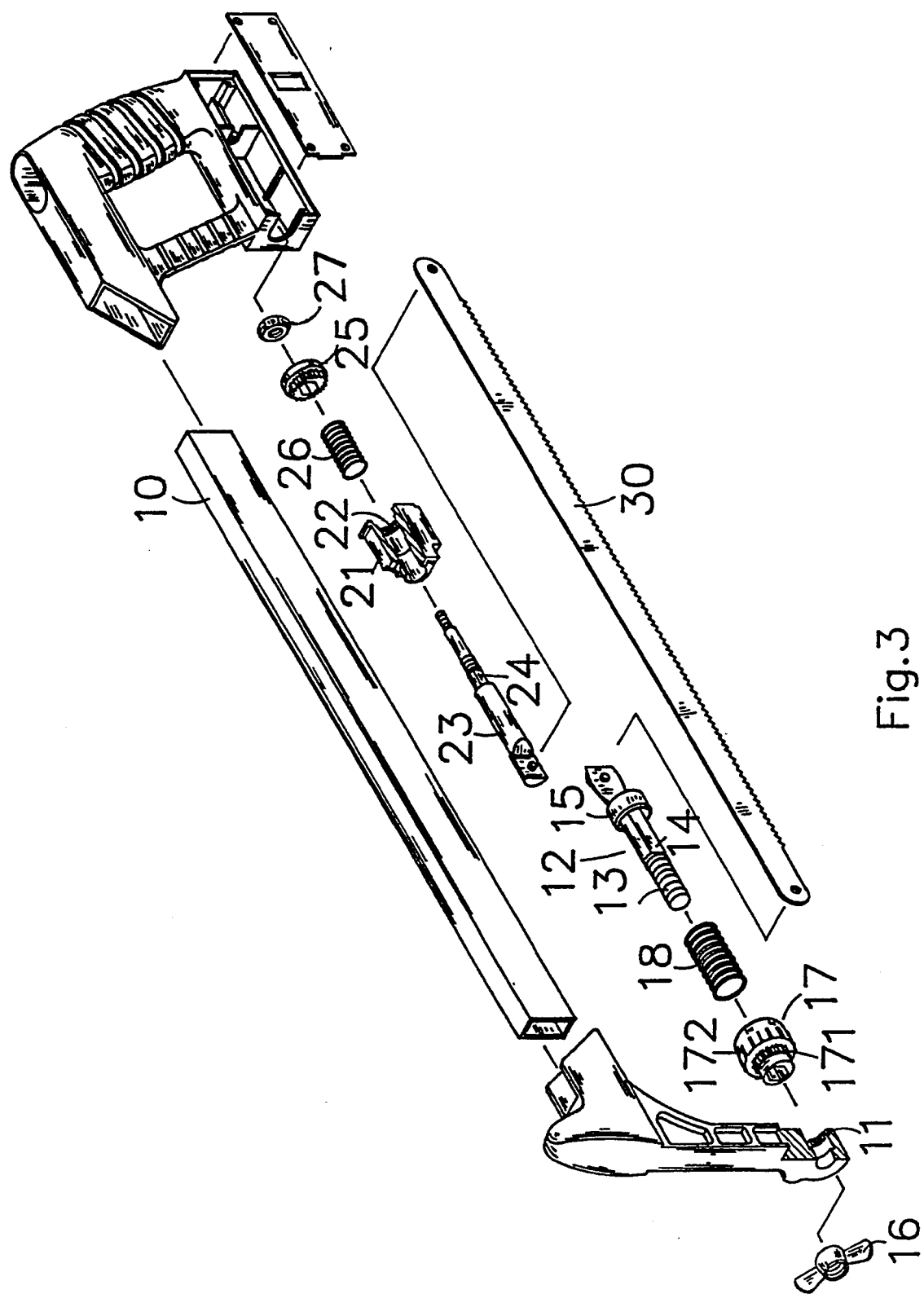
FIG. 3 is an exploded view of a saw blade adjusting mechanism according to the present invention.

Referring to FIG. 3, the handle and frame assembly 10 of the hack saw has a toothed through hole 11 on the front end thereof for passing a first tightening up rod 12. The first tightening up rod 12 has a screw rod 13 at one end inserted through the toothed through hole 11 and then threaded with a wing nut 16. The opposite end of the first tightening up rod 12 is connected to one end of the saw blade 30. The first tightening up rod 12 further comprises a collar 15 and a polygonal rod section 14 between the collar 15 and the screw rod 13. There is a rotary adjusting knob 17 and a first spring 18 are respectively mounted around the polygonal rod section 14 of the first tightening up rod 12, wherein the first spring 18 is engaged between the collar 15 and the rotary adjusting knob 17. The rotary adjusting knob 17 comprises a graduated knob body 172 and a ratchet wheel 171 extended from the graduated knob body 172 and meshed with the teeth around the toothed through hole 11. When meshed, the rotary adjusting knob 17 and the first tightening up rod 12 are prohibited from rotary motion. Because the first spring 18 is engaged between the collar 15 and the rotary adjusting knob 17, it gives a forward pressure to the rotary adjusting knob 17 causing the ratchet wheel 171 inserted into the toothed through hole 11 and then meshed with the teeth thereof. There is a locating block 21 fastened to the rear end of the handle and frame assembly 10, having a toothed through hole 22. A second tightening up rod 23 is inserted through the toothed through hole 22, having one end connected to the opposite end of the saw blade 30 and an opposite end threaded and threaded with a nut 27. The second tightening up rod 23 has a polygonal rod section 24 in the middle. A gear 25 and a second spring 26 are respectively mounted around the polygonal rod section 24. The second spring 26 is engaged between the gear 25 and an inside annular flange (not shown) in side the toothed through hole 22 of the second tightening up rod 23. Therefore, the second spring 26 gives a pressure to the gear 25 causing it released from the locating block 21. The number and pitch of the rotary adjusting knob 17 and the gear 25 match with that of the toothed through holes 11;22 so that moving or rotating the first tightening up rod 12 causes the second tightening up rod 23 moved or rotated synchronously.

Figure 4:
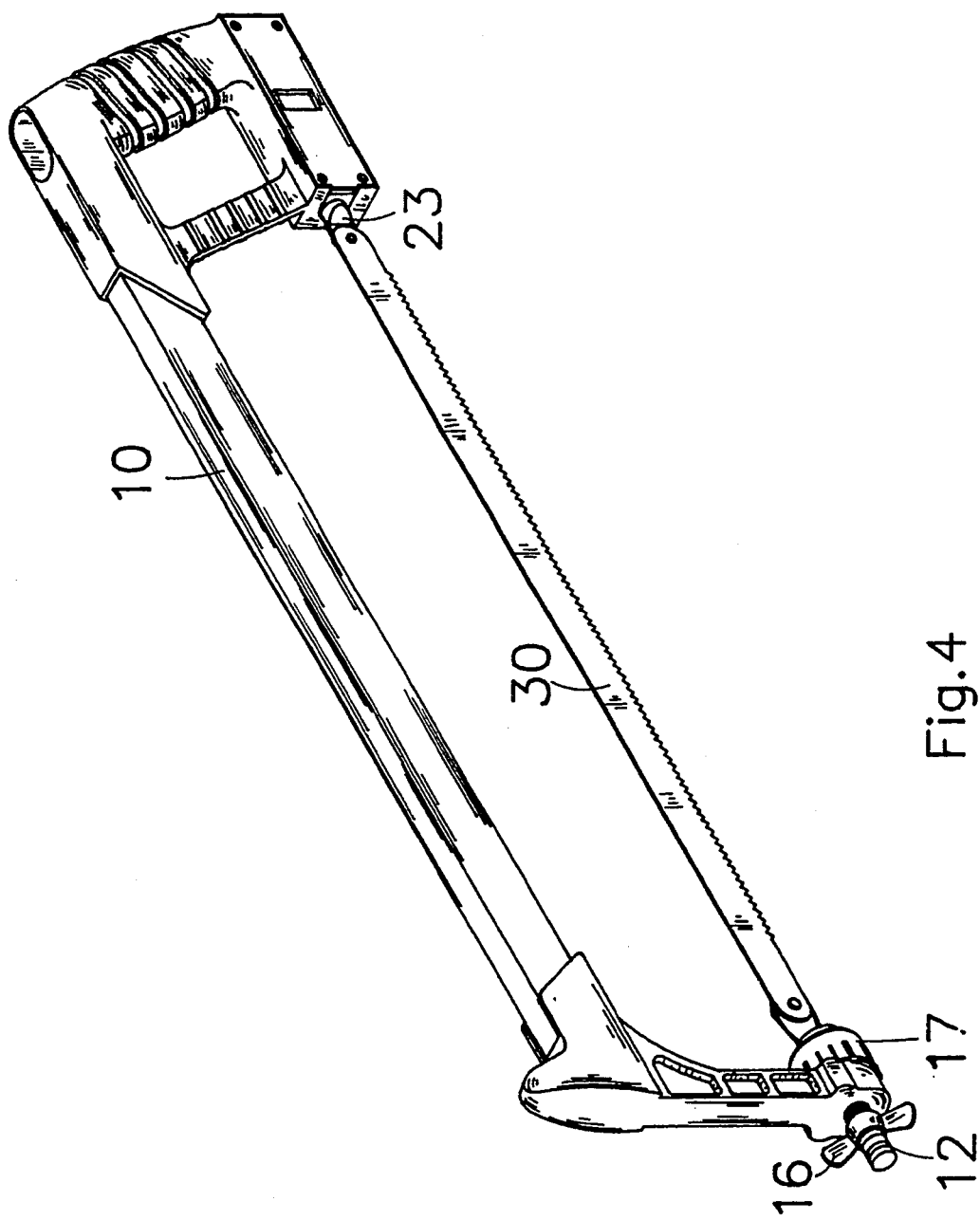
FIG. 4 is an elevational view of the saw blade adjusting mechanism shown in FIG. 3.
Figure 5:
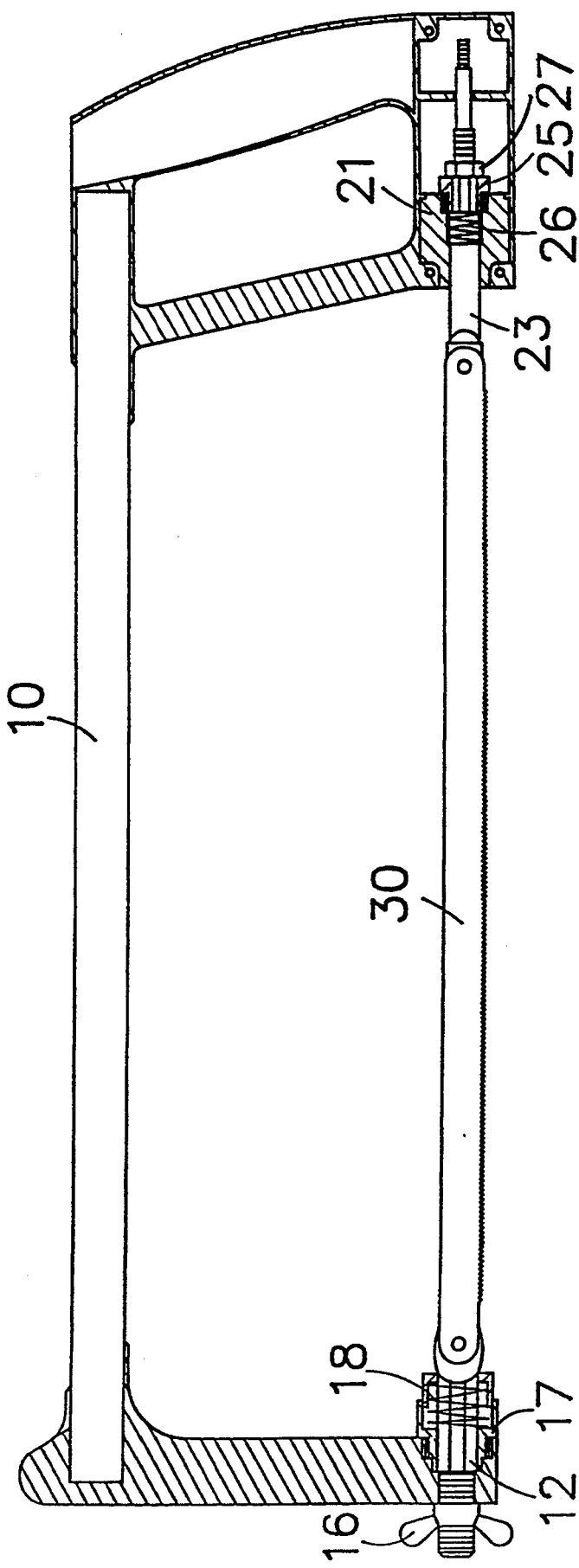
FIG. 5 is longitudinal view in section of FIG. 4.

Referring to FIGS. 4 and 5 and FIG. 3 again, when the wing nut 16 is turned to tighten the tension of the saw blade 30, the first and second springs 18;26 are compressed causing the ratchet wheel 171 of the rotary adjusting knob 17 and the gear 25 meshed with the teeth in the toothed through holes 11;22 respectively, and therefore the the saw blade 30 is prohibited from turned in either direction, i.e. the saw blade is fixed at the angle. When the wing nut 16 is loosened, the first and second springs 18;26 are released. At this stage, the ratchet wheel 171 of the rotary adjusting knob 17 is still meshed with the teeth in the toothed through hole 11, however the gear 25 is disengaged from the locating block 21. Then, the rotary adjusting knob 17 is moved backwards to compress the first spring 18 and to disengage the ratchet wheel 171 from the teeth of the toothed through hole 11, and then the rotary adjusting knob 17 is turned to rotate the first tightening up rod 12 causing the angular position of the saw blade 30 changed. When the rotary adjusting knob 17 is released from the hand after setting, the first spring 18 immediately pushes the rotary adjusting knob 17 forwards, causing the ratchet wheel 171 meshed with the teeth in the toothed through hole 11 again. When meshed, the wing nut 16 is turned tight to fix the saw blade 30 at the adjusted angular position.

While only one embodiment of the present invention has been shown and described, it will be understood that various modifications and changes could be made without departing from the spirit and scope of the invention.

It is claimed:

1. A hack saw comprising:

a saw blade including a first end and a second end, a frame assembly including a first end having a first toothed through hole formed therein and including a second end, a locating block fastened to said second end of said frame assembly and including a second toothed through hole formed therein, a first tightening up rod including a threaded front end inserted through said first toothed through hole and threaded with a first nut and including a flanged rear end connected to said first end of said saw blade, a second tightening up rod including a front end connected to said second end of said saw blade and including a threaded rear end inserted through said second toothed through hole and threaded with a second nut, a rotary adjusting knob mounted around said first tightening up rod and rotated to turn said first tightening up rod for changing angular position of said saw blade, said rotary adjusting knob including a front end terminating in a ratchet wheel for meshing with said first toothed through hole, a first spring means engaged around said first tightening up rod and engaged between said rotary adjusting knob and said flanged rear end of said first tightening up rod for biasing said rotary adjusting knob toward said first end of said frame assembly and for biasing said ratchet wheel to mesh with said first toothed through hole, a gear mounted around said second tightening up rod and meshed with said second toothed through hole, a second spring means engaged around said second tightening up rod and engaged between said gear and said locating block, said first and second tightening up rods being synchronously turned by said rotary adjusting knob in order to change angular position of said saw blade when said rotary adjusting knob is moved backwards to release said ratchet wheel from said first toothed through hole after said first nut is loosened.

* * * * *